United States Patent [19]
An

[11] Patent Number: 5,451,750
[45] Date of Patent: Sep. 19, 1995

[54] MICROWAVE OUTPUT STABILIZING APPARATUS OF A MICROWAVE OVEN AND A METHOD THEREOF

[75] Inventor: Seong W. An, Suweon, Rep. of Korea

[73] Assignee: Samsung Electronics Co., Ltd., Suwon, Rep. of Korea

[21] Appl. No.: 17,298

[22] Filed: Feb. 12, 1993

[30] Foreign Application Priority Data

Feb. 14, 1992 [KR] Rep. of Korea ................ 92-2199

[51] Int. Cl.$^6$ ............................................. H05B 6/68
[52] U.S. Cl. ................................. 219/716; 219/721; 363/49; 363/97
[58] Field of Search ................ 219/10.55 B, 10.55 M, 219/715, 716, 717, 721; 363/96, 97, 49, 21

[56] References Cited

U.S. PATENT DOCUMENTS

| | | | |
|---|---|---|---|
| 4,903,183 | 2/1990 | Noguchi et al. | 363/21 |
| 5,003,141 | 3/1991 | Braunisch et al. | 219/10.55 B |
| 5,171,948 | 12/1992 | Ishii | 219/10.55 B |
| 5,171,949 | 12/1992 | Fujishima et al. | 219/10.55 B |
| 5,274,208 | 12/1993 | Noda | 219/10.55 B |

FOREIGN PATENT DOCUMENTS

2-71993  5/1990  Japan .

*Primary Examiner*—Philip H. Leung
*Attorney, Agent, or Firm*—Burns, Doane, Swecker & Mathis

[57] ABSTRACT

A microwave output stabilizing apparatus for a microwave oven comprises a rectifier circuit for rectifying power from an AC power supply into a constant DC voltage; an invertor circuit for generating a high frequency power supply by controlling the DC voltage at an intermittent output state; a high voltage transformer for stepping up the high frequency power supply; and magnetron drive circuit for rectifying the high frequency power supply and oscillating a magnetron. Also, an inverter control circuit detects the current flowing into the primary winding of the high voltage transformer, converts the detected current into a corresponding voltage, the corresponding voltage with a reference voltage, and controls the inverter circuit according to the results of the comparison. Further included are an anode current detecting circuit for detecting the anode current of the magnetron and converting the detected anode current into the corresponding voltage; and, a reference voltage adjusting circuit for evaluating the anode current and changing the reference voltage of the invertor control circuit in accordance with the results of the evaluation.

6 Claims, 4 Drawing Sheets

MICROWAVE OUTPUT STABILIZING APPARATUS OF A MICROWAVE OVEN AND A METHOD THEREOF

BACKGROUND OF THE INVENTION

1. Field of the Invention

The present invention relates to a microwave output stabilizing apparatus of a microwave oven for maintaining the anode current of a magnetron within a given range by regulating the current flowing into the primary winding of a high voltage transformer, regardless of variations in the input voltage or the temperature of the magnetron, and a method thereof.

2. Background of the Invention

Utilizing the principle of dielectric heating, an inverter-type microwave oven has recently been developed for the purpose of reducing the size and weight of a microwave oven for heating and cooking foods. Such a conventional inverter-type microwave oven is disclosed by Japanese Utility Model Laid-Open No. 71993 (1990). The invention comprises a current detecting circuit which detects the current flowing into the anode of a magnetron. When the output characteristics of the magnetron are varied by excessive heat, the invention determines the amount of variation based on the amount of anode current detected by the circuit, and controls the amount of anode current so that the output of the magnetron can be consistently maintained.

FIG. 1 illustrates another microwave output stabilizing circuit comprising an over-current protecting circuit which protects the components of the appliance from an excess ire current caused by a short of the magnetron, and a circuit, (designated a soft start circuit hereinafter), which provides for smooth initial activation of the magnetron.

In FIG. 1, a rectifier circuit 1 converts power from a commercial AC power source into a constant DC voltage and an inverter circuit 2 inverts the DC voltage into a high frequency voltage by a switching element TR 1 incorporated therein. A high voltage transformer HVT and a magnetron drive circuit 3 step up the high frequency voltage to a voltage sufficiently high to oscillate the magnetron, which thereby forces the magnetron MGT to oscillate. An inverter control circuit 4 detects the amount of current flowing into the primary winding of the high voltage transformer HVT, monitors whether the detected current value is greater than a given reference value, and controls the inverter circuit 2 in accordance with the monitored results. When the voltage applied to the inverted(−) terminal of a comparator COMP1 is higher than the reference voltage supplied to the non-inverted(+) terminal thereof due to undesirable conditions, such as a variation in the input AC power, the output terminal of the comparator COMP1 will be at a low level.

Accordingly, transistor TR2 and transistor TR3 are consecutively turned on and transistor TR1 is turned off. FIGS. 2A and 2B are graphs showing the relationship between the voltage and current at the anode and cathode electrodes of a magnetron according to variations in the temperature of the magnetron.

In FIGS. 2A and 2B, as the temperature of the magnetron rises, the anode voltage or current increases. Consequently, the total microwave out increases. In the conventional microwave output stabilizing circuit described above, there is a problem that the variation in the microwave output due to the variation the input AC power becomes substantial because the predetermined reference voltage applied to the comparator COMP1 is fixed at a constant value. Moreover, another problem is that, at different times, even when similar foods are heated for the same amount of time, cooking conditions vary according to variations in the microwave output due to variations in the temperature of the magnetron.

SUMMARY OF THE INVENTION

It is an object of the present invention to provide a microwave output stabilizing apparatus of a microwave oven for maintaining the anode current of a magnetron within a limited range by regulating the output of an inverter circuit, and a method thereof.

It is another object of the present invention to provide a microwave output stabilizing apparatus of a microwave oven for consistently maintaining a microwave output regardless of variations in the input AC power or the temperature of the magnetron, and a method thereof.

According to one aspect of the present invention, the microwave output stabilizing apparatus comprises a rectifier circuit for rectifying power from an AC power supply into a constant DC voltage; inverter circuit for generating a high frequency power supply by controlling the DC voltage at an intermittent output state; a high voltage transformer for stepping up the high frequency power supply; and a magnetron drive circuit for rectifying the high frequency power supply and oscillating a magnetron. Also included is an inverter control circuit for detecting the current flowing into the primary winding of the high voltage transformer, converting the detected current into a corresponding voltage, comparing the corresponding voltage with a reference voltage, and controlling the inverter circuit according to the results of the comparison. Further included are an anode current detecting circuit for detecting the anode current of the magnetron and converting the detected anode current into a corresponding voltage; and, a reference voltage adjusting circuit for evaluating the anode current and changing the reference voltage of the inverter control circuit in accordance with the results of the evaluation.

According to another aspect of the invention, a microwave output stabilizing method is provided for use in a microwave oven for which rectifying an AC power supply into constant DC power voltage, generating a high frequency power supply by controlling a DC voltage at an intermittent output state, stepping up the high frequency power supply, and driving a magnetron with the stepped up power supply. The microwave output stabilizing method comprises the steps of evaluating the anode current of the magnetron by consecutively comparing the anode current with maximum and minimum anode current ratings; and, maintaining the anode current within the current ratings by controlling the switching period only if the anode current is less than a minimum current rating or greater than a maximum current rating.

BRIEF DESCRIPTION OF THE DRAWINGS

The invention is best understood by reference to the following description and accompanying drawings in which.

DETAILED DESCRIPTION OF THE INVENTION

Figure 1:
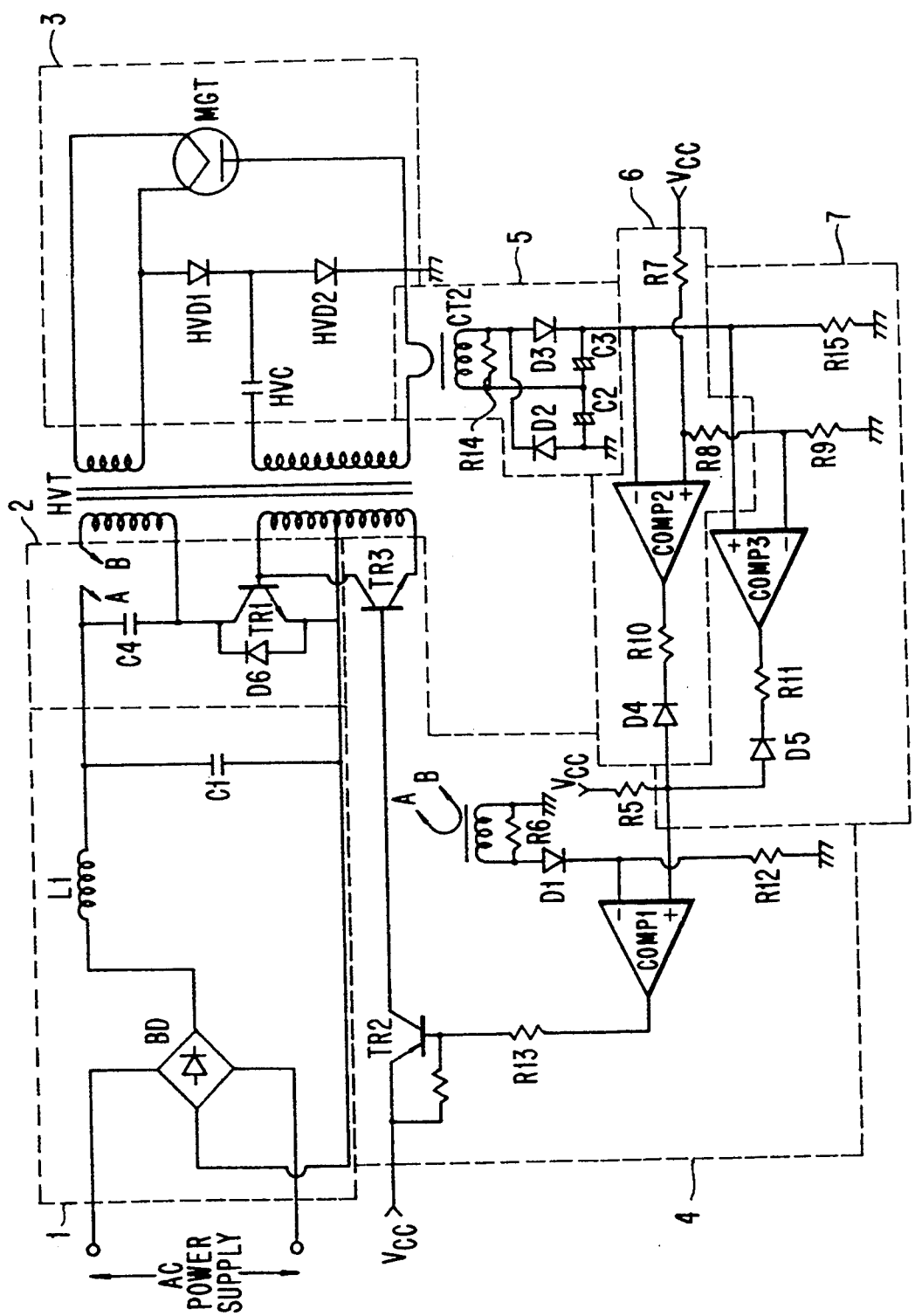
FIG. 1 is a diagram of a conventional microwave output stabilizing circuit of microwave oven.
Figure 2A:
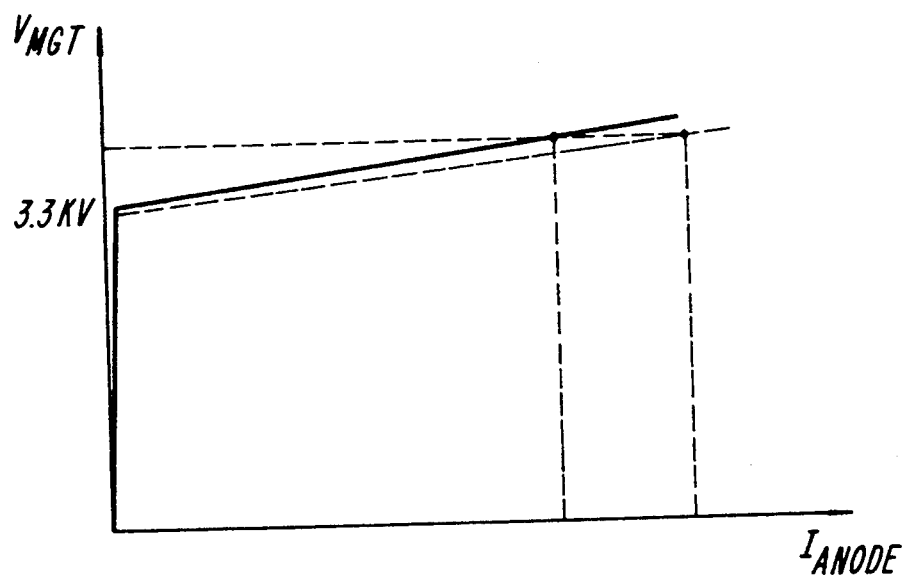
FIGS. 2A and 2B are graphs showing the relationship between the voltage and current at the anode and cathode electrodes of a magnetron according to variations in the temperature of the magnetron.
Figure 2B:
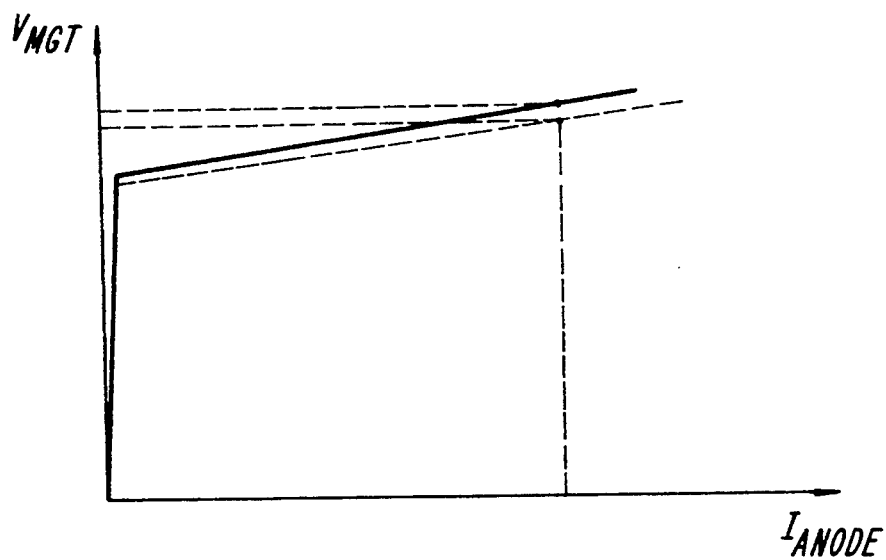
Figure 3:
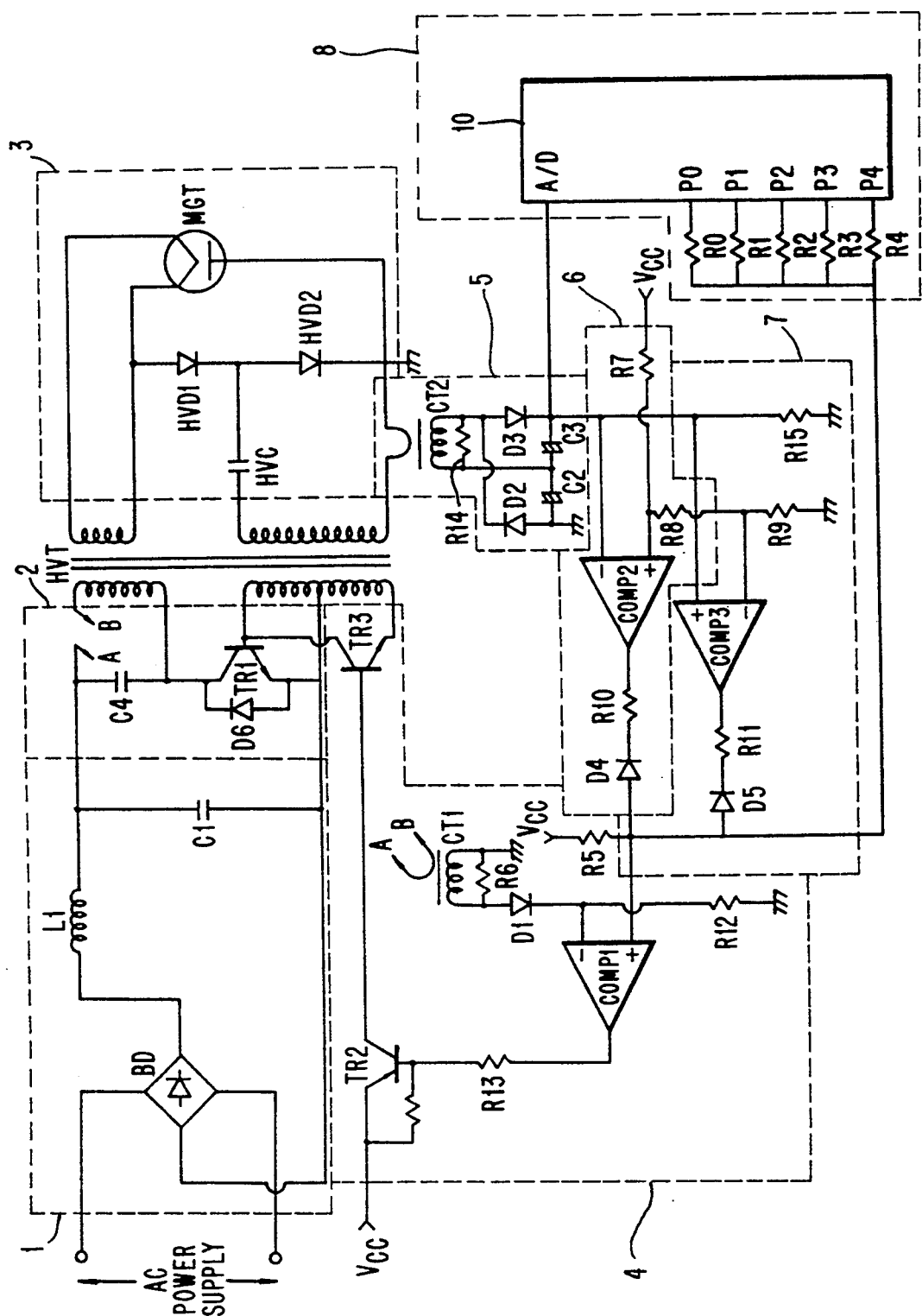
FIG. 3 is a diagram of a microwave output stabilizing circuit of a microwave oven according to the present invention; and, FIG. 4 is a flow chart showing an output stabilizing method of a microwave oven according to the present invention.

The present invention will now be described in detail with reference to the accompanying drawings. FIG. 3 illustrates a microwave output stabilizing circuit of a microwave oven according to the present invention. The apparatus comprises a rectifier circuit 1, an inverter circuit 2, a high voltage transformer HVT, a magnetron drive circuit 3, an inverter control circuit 4, an anode current detecting circuit 5, an over-current protecting circuit 6, a soft start circuit 7 and a reference voltage adjusting circuit 8. The rectifier circuit 1 comprises a diode bridge rectifier BD, a choke coil L1 and a smoothing condenser C1. The rectifier BD has four terminals, two of which are connected to a commercial AC power line, for example 100-V AC power line, and the other two are joined across the condenser C1 via the choke coil L1. The inverter circuit 2 comprises a resonant condenser C4, a switching transistor TR1 and a damper diode D6. One terminal of the condenser C4 is connected to the junction of the coil L1 and the condenser C1, and the other terminal thereof is connected to the collector of the transistor TR1. The condenser C4 and the transistor TR1 are connected in series and joined across the condenser C1. Moreover, the damper diode D6 is connected between the emitter and collector of the transistor TR1. The resonant condenser C4 and the primary winding of a high voltage transformer HVT comprise a parallel-resonant circuit. The magnetron drive circuit 3 comprises a high voltage condenser HVC, high voltage diodes HVD1 and HVD2 and a magnetron MGT. The heater-cathode electrodes of the magnetron MGT are connected across the filament winding of the high voltage transformer HVT. The anode of the diode HVD1 is joined to one terminal of the heater-cathode electrodes, and the cathode thereof is joined to the anode of the diode HVD2 whose cathode is grounded. One terminal of the condenser HVC is connected to the junction of the diodes HVD1 and HVD2, and the other terminal thereof is connected to the anode electrode of the magnetron MGT via the high voltage secondary winding of the transformer HVT. Moreover, one terminal of the high voltage second winding and the anode electrode of the magnetron MGT are grounded.

The inverter control circuit 4 comprises a current-transformer CT1, amplifying transistors TR2 and TR3, a comparator COMP1, a reverse-current blocking diode D1 resistors and the like. The primary winding of the transformer CT1 is inserted between the condenser C4 and the primary winding of the transformer HVT. A resistor R6 is joined across the secondary winding of the transformer CT1. The anode of the diode D1 is joined to one terminal of the resistor R6, and the cathode thereof is grounded via a voltage divider resistor R12. The inverted(−) terminal of the comparator COMP1 is connected to the junction of the cathode of the diode D1 and the resistor R12. The non-inverted(+) terminal thereof is supplied with a reference voltage which is a power supply voltage Vcc divided by a resistor R5. The output terminal of the comparator COMP1 is joined to the base of the transistor TR2 via a current limiting resistor R13. The collector of the transistor TR2 is joined to the base of the transistor TR3 and the emitter thereof is provided with a power supply voltage Vcc. The collector of the transistor TR3 is joined to the base of the transistor TR1.

The anode current detecting circuit 5 comprises a current-transformer CT2, a pair of voltage doublers having diodes D2 and D3, and condensers C2 and C3. The primary winding of the transformer CT2 is inserted between one terminal of the high voltage secondary winding and the anode electrode of the magnetron MGT. A resistor R14 is joined across the secondary winding of the transformer CT2. The anode of diode D3 and the cathode of diode D2 are joined to one terminal of the resistor R14. The condensers C2 and C3 are connected in series and joined between the anode of the diode D2 and the cathode of the diode The junction of the condensers C2 and C3 is joined to the other terminal of the resistor R14. Moreover the anode of the diode D2 grounded.

The over-current protecting circuit 8 comprises a comparator COMP2, a reverse-current blocking diode D4 and resistors R7 through R10. The inverted(−) terminal of the comparator COMP2 is joined to the cathode of the diode D3, and the non-inverted(+) terminal thereof is supplied with a reference voltage which is the power supply voltage Vcc divided by the resistors R7 through R9. The output terminal of the comparator COMP2 is joined to the non-inverted(+) terminal of the comparator COMP1 via the resistor R10 and the diode D4 connected in series.

The soft start circuit 7 comprises a comparator COMP3, a diode D5 and resistors R11 and R15. The non-inverted(+) terminal of the comparator COMP3 is supplied with a voltage which is multiplied by the voltage doubler and divided by the resistor R15. The inverted(−) terminal of the comparator COMP3 is provided with a reference voltage which is the power supply voltage Vcc divided by the resistors R7 through R9. The output terminal of the comparator COMP3 is joined to the non-inverted(+) terminal of the comparator COMP1 via the resistor R11 and diode D5 connected in series.

The reference voltage adjusting circuit 8 comprises a microprocessor 10 for controlling the entire operation of the appliance, and parallel-connected resistors R0 through R4. The port A/D of the microprocessor 10 is joined to the cathode of the diode D3. The common terminal of the parallel-connected resistors R0 through R4 is joined to the non-inverted(+) terminal of the comparator COMP1. The other terminals of resistors R0 through R4 are joined to the corresponding ports P0 through P4 of the microprocessor 10.

The operations of the apparatus of the present invention will now be described in detail. The commercial AC power supply is initially rectified into full waveform through the rectifier BD, and then shaped into a constant DC voltage through the choke coil L1 and smoothing condenser C1. As this constant DC voltage is applied to the inventor circuit 2, current flows into the primary winding of the transformer HVT and the switching transistor TR1. The transformer CT1 detects the current flowing into the primary winding of the transformer HVT. This detected current is converted into a constant voltage by the resistor R6 and diode D1. The converted voltage is supplied to the inverted(−) terminal of the comparator or COMP1. The non-inverted(+) terminal of the comparator COMP1 is supplied with the reference voltage. When the voltage applied to the inverted(−) terminal of comparator COMP1 is higher than the reference voltage, the output terminal of the comparator COMP1 is at a low level.

Accordingly, transistors TR2 and TR3 are consecutively turned on, and a switching transistor TR1 is turned off. When the current flowing into the primary winding of the transformer HVT is charged, discharged and charged again into the condenser C4, the switching transistor. TR1 is again turned on by the exiting-current of the transformer HVT. Thus, the switching cycle of the switching transistor TR1 has different functions due to the variation in the input AC power, thereby enabling the microwave output of the magnetron MGT to remain constant.

The anode current, detected by the current transformer CT2, is converted into DC voltage through the voltage doubler, and provided to the inverted(−) terminal of comparator COMP2. When the magnetron is short circuited due to undesirable conditions the voltage applied to the inverted (−) terminal of the comparator COMP2 will be greater than the reference voltage applied to the non-inverted(+) terminal thereof.

Accordingly, the output terminals of the comparators COMP2 and COMP1 are consecutively at low levels, and the transistors TR2 and TR3 are consecutively turned on, while the transistor TR1 is turned off. The DC voltage from the voltage doubler is also applied to the non-inverted(+) terminal of the comparator COMP3. When the magnetron MGT starts to oscillate, the output terminals of the comparators COMP3 and COMP1 are at low levels, and the transistors TR2 and TR3 are consecutively turned on, while the transistor TR1 turned off.

Accordingly, until the filament winding of the magnetron MGT is fully heated, a lower than normal power is provided to the magnetron MGT. The DC voltage from the voltage doubler is applied to the port A/D of the microprocessor 10, and is converted into digital signals in the microprocessor 10. Then, the microprocessor 10 outputs the proper binary signals from the ports P0 through P4 to vary the reference voltage applied to the non-inverted(+) terminal of the comparator COMP1. Based on the anode current detected by the anode current detecting circuit 5, the different resistors R0–R4 are joined to the non-inverted(+) terminal of the comparator COMP1, thereby varying the duty cycle of the switching transistor TR1. Accordingly, it is possible to maintain the anode current within a limited range.

Figure 4:
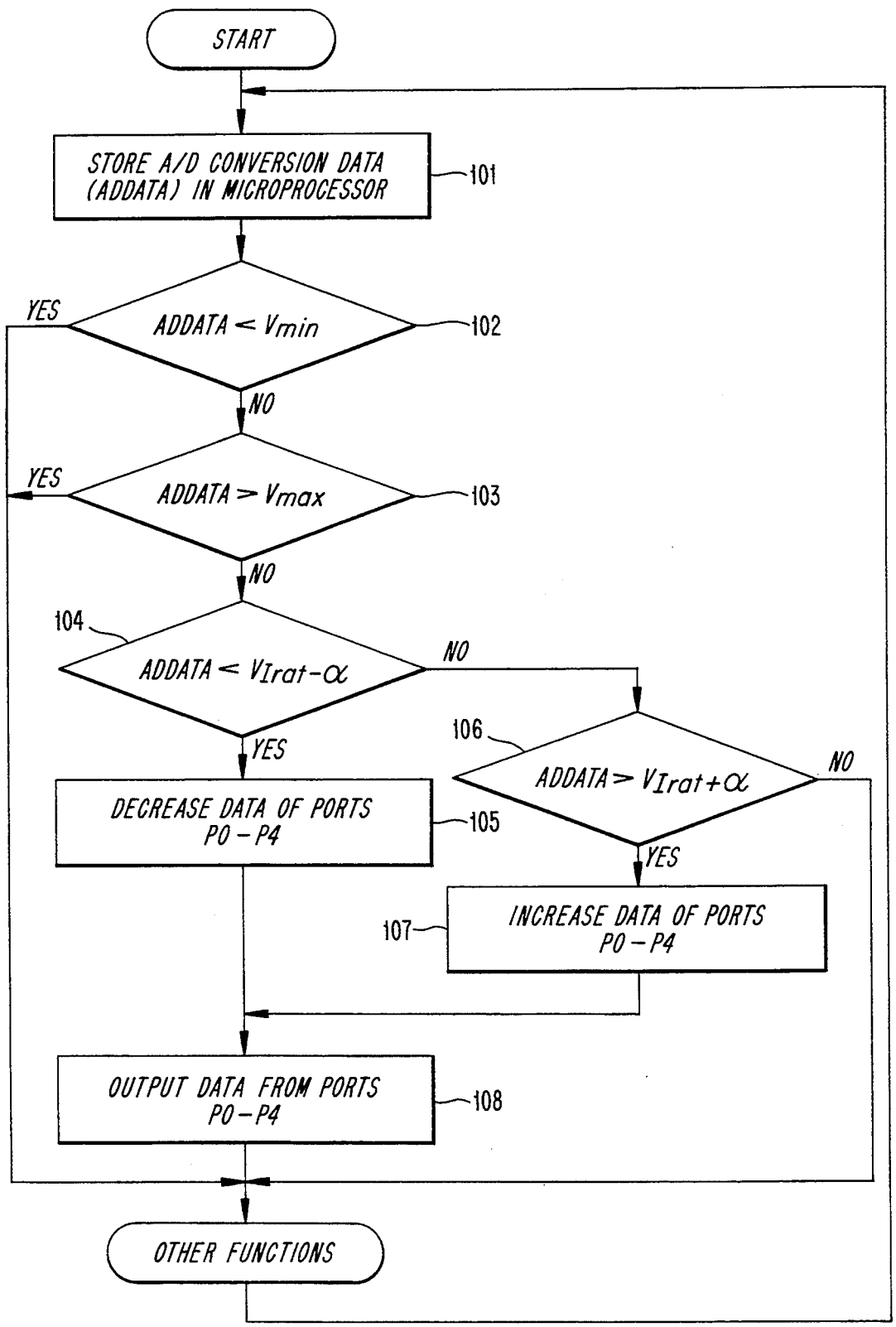

FIG. 4 is a flow chart showing an output stabilizing method of a microwave oven according to the present invention. At stage 101, the voltage, detected and converted through the anode current detecting circuit 5, is supplied to the port A/D of the microprocessor 10, and then converted into corresponding digital signals and stored in a Buffer ADDATA thereof.

At stage 102, the value stored in the buffer ADDATA is compared to the voltage value Vmin which is the level at which the soft start circuit 7 starts to operate. At stage 102, when the value ADDATA is greater than the value Vmin, the process proceeds to stage 103.

When the value ADDATA is less than the value Vmin, the soft start circuit 7 immediately starts to operate.

At stage 103, the value ADDATA is compared to the voltage Vmax at which the over-current protecting circuit 6 starts to operate. At stage 103, when the value ADDATA is greater than the value Vmax, the over-current protecting circuit 6 immediately starts to operate. On the contrary, when the value ADDATA is less than the value Vmax, the value ADDATA is consecutively compared with the voltage values $V_{Irat-a}$ and $V_{Irat+a}$, corresponding respectively to the maximum and minimum ratings of the anode current, at stages 104 and 106.

At stage 104, if the value ADDATA is less than the value $V_{Irat-a}$, the reference voltage of the comparator COMP1 is increased by the appropriate resistors which are selected according to the binary signals from the ports P0–P4 of the microprocessor 10.

At stage 106, if the value ADDATA is greater than the value $V_{Irat+a}$, the reference voltage resistor of the comparator COMP1 is decreased by the binary signals from the ports P0–P4 of the microprocessor 10. For example, when the binary signal which is output from the ports P0–P4 of the microprocessor 10 is $10101_2$, the resistors R0, R2 and R4 are selected, and the equivalent resistance becomes R0//R2//R4 (=R0*R2*R4/(R0*R2 +R2*R4+R4*R0)). Accordingly, the reference voltage of the comparator COMP1 is changed by a factor (R0//R2//R4)/(R0//R2//R4+R5). When $V_{Irat-K}$<ADDATA<$V_{Irat+a}$, the binary values from the ports P0–P4 are $00000_2$, the reference voltage of the comparator COMP1 remains at the existing value.

In the afore-mentioned manner, it is possible to maintain the anode current within a limited range. In the embodiment described above, the reference voltage is changed by software loaded into the microprocessor 10, but it is also possible to change the reference voltage using a hardware configuration.

What is claimed:

1. A microwave output stabilizing apparatus for a microwave oven, comprising:
   a rectifier circuit for rectifying power from an AC power supply into a constant DC voltage;
   an inverter circuit for generating a high frequency power signal by controlling said DC voltage at an intermittent output state;
   a high voltage transformer for stepping up said high frequency power signal;
   a magnetron drive circuit including a magnetron for rectifying the stepped up high frequency power signal and causing a magnetron to oscillate;
   an inverter control circuit for detecting a current flowing into a primary winding of said high voltage transformer, converting said detected current into a corresponding first voltage, comparing said corresponding first voltage with a reference voltage and controlling said inverter circuit according to a result of said comparing;
   an anode current detecting circuit for detecting an anode current of said magnetron and converting said detected anode current into a voltage corresponding to a second voltage; and
   a reference voltage adjusting circuit including a plurality of resistors and a microprocessor for determining whether the detected anode current is within a predetermined range thereof and for controlling a parallel connection of said resistors to control said reference voltage to be applied to said inverter control circuit in accordance with said voltage corresponding to said detected anode current.

2. The microwave output stabilizing apparatus for a microwave oven according to claim 1, further comprising an over-current protecting circuit for controlling said inverter control circuit by determining whether said magnetron is short circuited based on said second voltage corresponding to said detected anode current.

3. The microwave output stabilizing apparatus for a microwave oven according to claim 1, further comprising a soft start circuit for controlling said inverter control circuit by determining whether said magnetron is in an initial run state based on said second voltage corresponding to said detected anode current.

4. A microwave output stabilizing apparatus for a microwave oven, comprising:
   a rectifier circuit for rectifying power from an AC power supply into a constant DC voltage;
   an inverter circuit for generating a high frequency power signal by controlling said DC voltage at an intermittent output state;
   a high voltage transformer for stepping up said high frequency power signal;
   a magnetron drive circuit including a magnetron for rectifying the stepped up high frequency power signal and causing a magnetron to oscillate;
   an inverter control circuit for detecting a current flowing into a primary winding of said high voltage transformer, converting said detected current into a corresponding first voltage, comparing said corresponding first voltage with a reference voltage and controlling said inverter circuit according to a result of said comparing;
   an anode current detecting circuit for detecting an anode current of said magnetron and converting said detected anode current into a voltage corresponding to a second voltage; and
   a reference voltage adjusting circuit for controlling said reference voltage of said inverter control circuit in accordance with said voltage corresponding to said detected anode current, said reference voltage adjusting circuit including
      a plurality of resistors selectably connectable to control a voltage to be presented to said inverter control circuit, and
      a microprocessor including an A/D input and a plurality of output ports, said A/D input being connected to said anode current detecting circuit to receive said second voltage, said microprocessor determining whether the anode current is within a predetermined range on the basis of said second voltage and producing an output collectively at said plurality of output ports based on said determination, said output controlling connection of said plurality of resistors.

5. The microwave output stabilizing apparatus for a microwave oven according to claim 4, further comprising an over-current protecting circuit for controlling said inverter control circuit by determining whether said magnetron is short circuited based on said second voltage corresponding to said detected anode current.

6. The microwave output stabilizing apparatus for a microwave oven according to claim 4, further comprising a soft start circuit for controlling said inverter control circuit by determining whether said magnetron is in an initial run state based on said second voltage corresponding to said detected anode current.

* * * * *